June 17, 1952  H. G. GOETZ ET AL  2,600,636
DEFINITE POSITION RELEASE TYPE CLUTCH
Filed Oct. 12, 1948  4 Sheets-Sheet 1

INVENTORS:
Henry G. Goetz & Henry F. Ruschmann,
BY George D. Richards,
Attorney

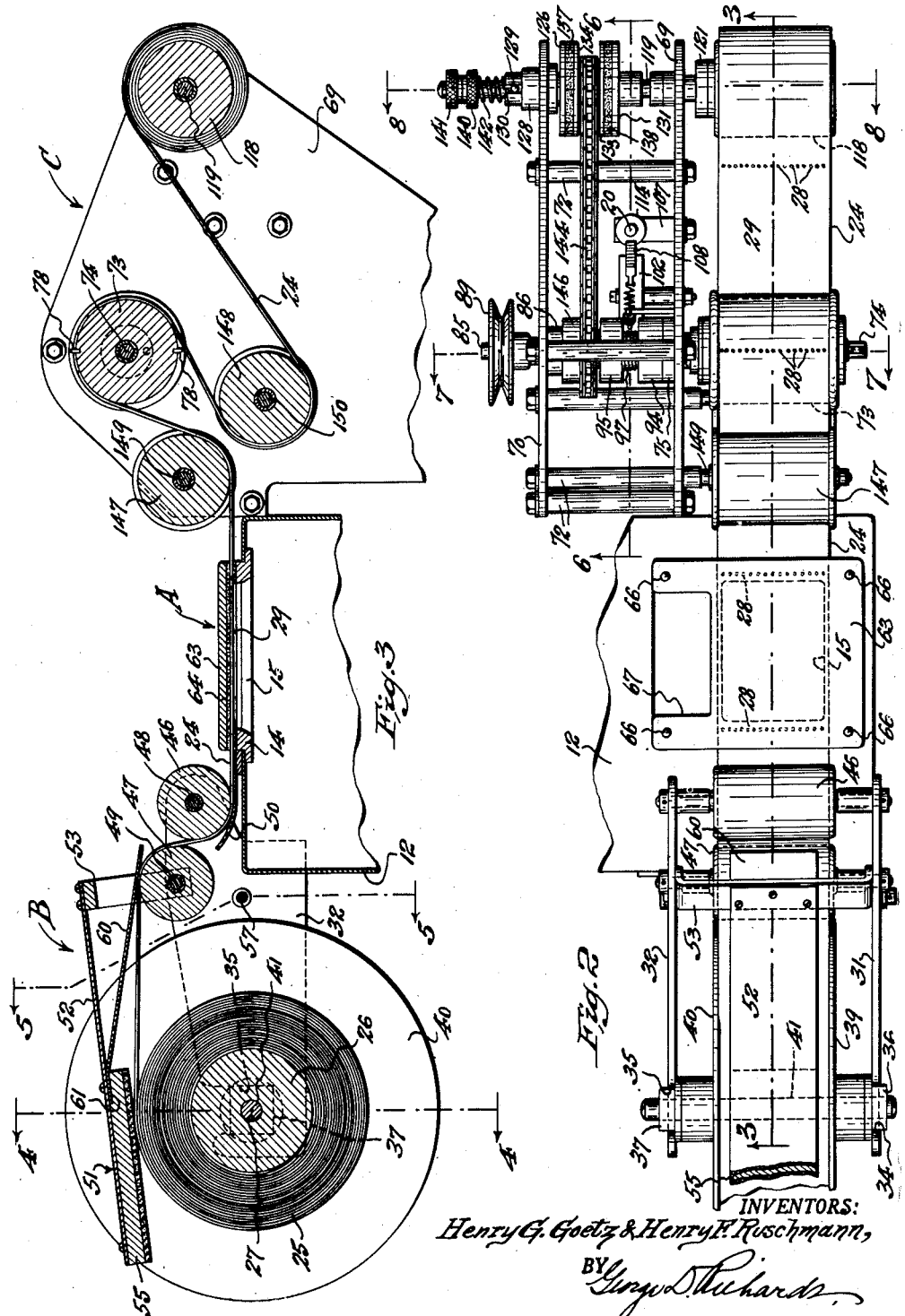

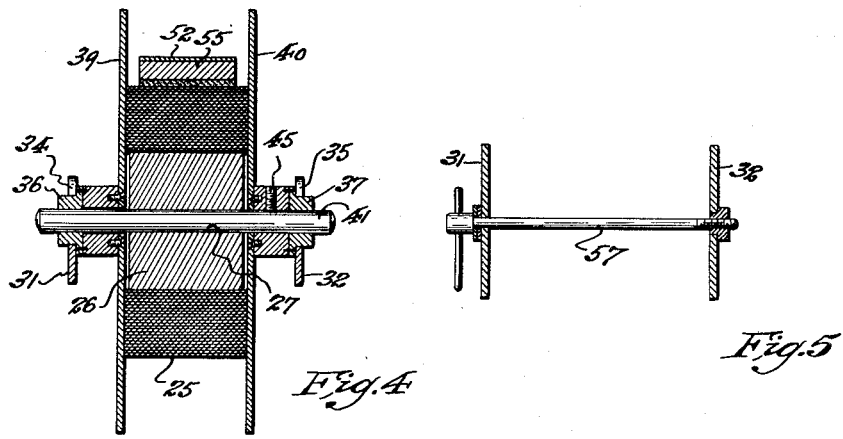
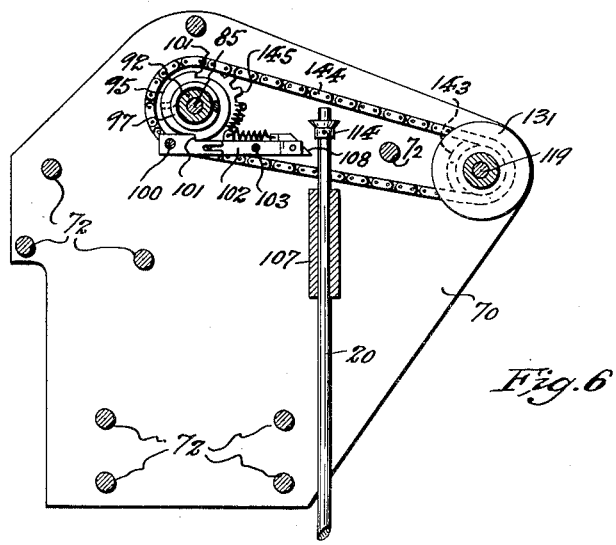
INVENTORS:
Henry G. Goetz & Henry F. Ruschmann,
BY George D. Richards
Attorney June 17, 1952     H. G. GOETZ ET AL     2,600,636
DEFINITE POSITION RELEASE TYPE CLUTCH
Filed Oct. 12, 1948     4 Sheets-Sheet 4

INVENTORS:
Henry G. Goetz & Henry F. Ruschmann,
BY George S. Richards
Attorney

Patented June 17, 1952

2,600,636

UNITED STATES PATENT OFFICE 2,600,636

DEFINITE POSITION RELEASE TYPE CLUTCH

Henry G. Goetz, Short Hills, and Henry F. Ruschmann, Bernardsville, N. J.

Application October 12, 1948, Serial No. 54,052

1 Claim. (Cl. 192—33)

The invention relates in general to photographic printing apparatus and has particular reference to printers of the rapid, photo-electric type.

Heretofore, photographic printers of that type have been designed to produce individual prints on cut paper. It being desirable to produce prints in strip form, the primary object of the invention is to provide a strip feed attachment for such printers which is adapted to be coordinated with the printing mechanism in a manner which permits a strip of sensitized paper to be fed intermittently, under control of the operator, past the exposure aperture, whereby successive areas or print frames of the strip are exposed to printing light transmitted through a succession of negatives or equivalent photographic media.

Another object of the invention is to provide a strip feed attachment of the character mentioned which is simple in construction and whose attachment to a standard printer involves only minor modification of the latter.

A further object is to provide novel strip tensioning means adapted to prevent injury to the strip under conditions of sudden acceleration and deceleration incident to rapid printing of successive strip frames.

Other objects and advantages of the invention, not at this time more particularly enumerated, will become apparent as the following specific description is read in connection with the accompanying drawings, in which:

Fig. 2 is a plan view of the strip feeder means alone, drawn on an enlarged scale, the printer being shown broken away;

Fig. 3 is a longitudinal vertical section on line 3—3 in Fig. 2;

Fig. 4 is a tranverse vertical section on line 4—4 in Fig. 3;

Fig. 5 is a tranverse vertical section on line 5—5 in Fig. 3;

Fig. 6 is a longitudinal vertical section on line 6—6 in Fig. 2;

Figure 1:
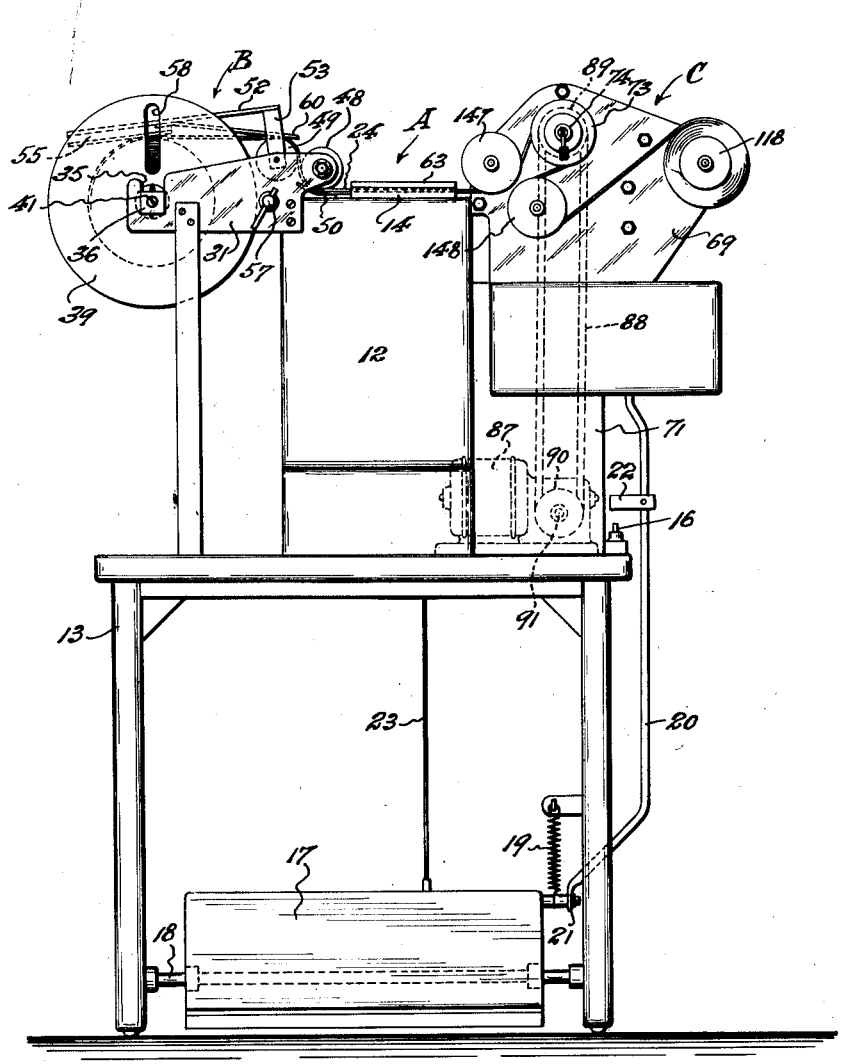
Fig. 1 is a front elevation of a well known type of rapid printer having the novel strip feeder means of this invention attached thereto.

Referring now to the drawings, wherein like reference characters indicate corresponding parts in the several views, the character 12 designates the housing of a well known type of rapid photographic printer, said housing being supported in the usual manner by a stand 13. Housing 12 contains all the negative holding and changing mechanism, the source of printing light, the light projecting optical system which causes printing light transmitted through each successive negative to focus a photographic image in a printing plane substantially coincident with an exposure aperture or panel in the roof of housing 12, and the photo-electric means for automatically timing and regulating the amount of printing light which is transmitted through each negative to the sensitized paper so as to allow for variations in negative density and area and in the grade of paper used. Since the instant invention does not involve improvement of the printer itself (which is well known to the art), the apparatus contained in housing 12 has not been disclosed in the drawings.

In adapting the printer to the attached strip feeder, a few minor modifications were made in the former. One such modification was the replacement of the heretofore used rather complicated paper mask assembly at the exposure aperture by a simple paper mask 14 having a suitably sized exposure aperture 15. Another change consisted in elimination of the hand lever formerly used for operating an actuating or control switch 16, which is situated outside housing 12 and serves, when closed, to start the electrical apparatus of the printer in its cycle of automatic operations required for each printing exposure. The hand lever has been replaced by means which permits foot operation of the control switch and synchronizes its closing and opening with the operations of the new strip feeding mechanism. This means includes a treadle 17, which is pivotally mounted, as at 18, in the lower part of stand 13 in a position convenient to an operator, especially when seated in front of the machine. The pivotal axis for treadle 17 preferably is located intermediate of the front and rear edges of said treadle. The rear edge of treadle 17 is supported yieldably in elevated position by suitable means such as pull spring 19. Treadle 17 thus is adapted to be operated by downward toe pressure on its rear portion and to be restored automatically to its normal position by spring 19 when pressure has been withdrawn. An upright, reciprocatable control rod 20 has its lower end connected pivotally to treadle 17, as at 21, at a point in rear of pivoting means 18. A horizontally projecting switch-closing finger 22 is adjustably mounted on control rod 20 in overlying relation to control switch 16 and is secured in adjusted position by suitable means. Further consideration of the switch operating means will be deferred until after the new strip feeder has been described. A still further change was elimination of the usual knee lever which was employed to operate the negative holder (not shown). The negative holder now is connected operatively to the rear edge of treadle 17 by connecting rod 23.

In accordance with the invention, a strip 24 of sensitized paper is fed intermittently through printing station A defined by paper mask 14 from magazine section B on the left side of housing 12 to strip operating section C on the right (see Fig. 1). Strip 24 necessarily must be held stationary while the area thereof located at printing station is being exposed to printing light. At the end of each exposure, strip 24 must be shifted to the right an appropriate distance to bring an unexposed area into printing station A. This step by step movement is accomplished at the will of the operator by controlling the strip operating mechanism in section C in coordination with the printing cycle.

Magazine section B serves to hold a substantial length of sensitized paper in strip form and to release it under proper tension for movement through printing station A under the draft exerted by the propulsive mechanism located in section C. Since sensitized paper strips are available in rolls, magazine section B has been designed to accommodate one of such rolls at a time.

As shown particularly in Figs. 3 and 4, each roll 25 of sensitized paper includes a central core 26 of cylindrical form on which strip 24 is rolled with its emulsion side facing inward. For a purpose which will become apparent later, each core should be slightly shorter than the width of the paper strip, whereby the flat side faces of roll 25 will project beyond the core ends. An axial bore 27 is provided in core 26 for rotational mounting purposes. In order to facilitate separation of each strip 24 into individual pictures after printing, developing and drying have been completed, it is desirable to use strips which have been perforated transversely in parallel rows of perforations 28. Adjacent rows are spaced apart a distance sufficient to define a print frame 29 of the proper span to cover the aperture 15 in mask 14 with a suitable margin for production of an attractive, well-balanced print. The rows of perforation 28 also serve a purpose related to precision of intermittent strip feeding which will be described later.

In construction, magazine section B includes a simple frame formed by parallel front and rear plates 31 and 32 respectively, which are attached to housing 12 by suitable means. Plates 31 and 32 preferably are made of somewhat resilient metal or other material in order that they may be yieldable toward and away from each other under pressure applied to points spaced from the ends thereof which are rigidly connected to housing 12. The purpose of this yieldable feature of construction will appear as the description progresses. Near the free ends of plates 31 and 32, a pair of vertical slots 34 and 35 are provided. These slots are directly opposite each other and open through the upper edges of plates 31 and 32 so as to form sockets for reception of the squared hubs 36 and 37 of a strip feeding magazine constituted by circular side discs 39 and 40 and shaft 41. Shaft 41 extends through the discs 39 and 40 and their respective hubs and serves three principal purposes. Primarily, it forms a stationary spindle adapted to fit bore 27 in core 26 of each roll of sensitized paper which may be loaded in the magazine. Secondarily, it maintains side discs 39 and 40 rigidly in parallel, aligned relation to each other. Finally, its protruding ends form handles by which the magazine may be lowered into its seat in frame 31—32, or may be lifted therefrom. It is intended that the magazine shall be non-rotatable and this condition is insured by the engagement of squared hubs 36 and 37 in slots 34 and 35. Suitable means, such as set screw 45, is employed to secure one hub, as 37, of disc 40 to shaft 41. It being desirable that discs 39 and 40 shall be shiftable axially with respect to each other, hub 36 of disc 39 is freely slidable on shaft 41. This arrangement also permits removal of disc 39 from shaft 41 when loading or unloading the magazine.

Magazine section B includes means for guiding strip 24 from magazine to printing station A in such a manner that the strip will enter the plane of the upper surface of paper mask 14 in the approach to said station. The guiding means comprises a pair of horizontal rollers 46 and 47 which preferably are journaled on shafts 48 and 49 which extend between frame plates 31 and 32. Roller 46 is disposed at such a level that the plane of the upper surface of mask 14 will be tangential to the roller periphery directly beneath the axis of rotation. Roller 47 is located between roller 46 and the rim of the magazine. This arrangement of the two guide rollers permits running of strip 24 over roller 47 and under roller 46. Due to the fact that the emulsion side of strip 24 is underneath, roller 47 may preferably be made of soft rubber or some similar material which will not injure the emulsion coating. To facilitate threading the leading end of a new strip under roller 46, a guide plate 50 is positioned under said roller. The right end portion of plate 50 is flat and is flush with mask 14, whereas the free end portion is curved upwardly toward the under surface of roller 47. When strip 24 is inserted downwardly between rollers, it will be deflected under roller 46 and guided smoothly onto mask 14 by guide plate 50. Guide plate 50 is preferably resilient so as to exert gentle pressure against strip 24 in its passage under roller 46. Mild tensioning action on strip 24 therefore is applied and is sufficient to prevent buckling of the trailing end of said strip as it approaches printing station A after the roll 25 in the magazine has been completely unwound.

An essential characteristic of the novel strip feeder is the controllable intermittent motion of strip 24, which involves rapid acceleration and sudden deceleration as the strip is advanced to clear printing station A of each print frame immediately after printing exposure has terminated and to bring the succeeding, unexposed frame into said station. Under such operational conditions, the inertia of roll 25 and its core 26 and of guide roller 47 must be counteracted or risk of serious damage to strip 24 occurs. To meet this situation, provision has been made for maintaining strip 24 under constant tension so that the jerking action to which it is subjected will not find it in a slack condition in which it would be vulnerable to injury.

Strip tensioning can best be accomplished by preventing over-running of roll 25 and its core each time the forward motion of strip 24 is interrupted. For reasons which will be explained presently, two interacting means have been provided for doing this. One such means is in the form of a gravity brake 51 which is applied continually to the periphery of roll 25. Brake 51 includes a plate 52 which is attached to a bifurcated member 53 by suitable means. Member 53 has depending arms straddling roller 47 and pivotally connected to shaft 49, and thus is located in a suitable position to serve as supporting means for brake 51. A weighty contact shoe 55 is carried by the free end portion of plate 52 and is adapted to be positioned above roll 25 between magazine discs 39 and 40 for direct contact with the outermost convolution or periphery of said roll. The other strip tensioning means produces a controlled braking effect which is adapted to be applied to the side faces of roll 25. The last-mentioned braking effect is partially attained by the resilient frame plates 31 and 32. A drawrod 57 serves as convenient means by which plates 31 and 32 may be caused to bear with precisely regulated force against magazine discs 39 and 40, which act as brake shoes and thereby transmit braking pressure from plates 31 and 32 to the side faces of roll 25 with which said discs are in direct contact. Because the ends of core 26 do not project outward as far as the sides of roll 25, there will be no contact of discs 39 and 40 with the core. This is a necessary condition because the core ends are thus prevented from limiting inward pressure of discs 39 and 40 against the yieldable side faces of roll 25, which faces, due to the usual deckle edge of strip 24, afford greater braking friction for a given degree of plate pressure than would the relatively smooth, hard end faces of the core.

Both of the above-mentioned braking means are required. Their strip-tensioning functions are interrelated in such a manner that neither braking means could be omitted without seriously affecting the operation of the strip feeder as a whole. The reason is as follows: The braking effect of gravity brake 51 will decrease steadily in direct proportion to the reduction in radius of roll 25 as the roll is depleted by feeding operation of the machine. By making brake plate 52 and shoe 55 sufficiently heavy, brake 51 alone could serve to prevent over-running of roll 25 throughout the period occupied in completely stripping the roll from core 26, but due allowance would not be made for the steadily increasing resistance to each starting impulse applied to strip 24 by the intermittent feed means of section C, which results from the progressive reduction in radius of the roll. A brake of the gravity type which is heavy enough to prevent over-running when the roll is full-size would increase the resistance to acceleration to such a degree that breaking of the strip would be inevitable. It is therefore necessary to give gravity brake 51 only that weight consistent with safe resistance to pull-off acceleration. In so doing, brake 51 will be rendered so light that it cannot in itself insure against over-running of roll 25 when full-size. From the full-size condition until the roll radius has been reduced to a determinable value, additional braking force is required to supplement the effect of brake 51. The braking effect of discs 39 and 40 fills that need. In order that the operator may ascertain, by visual inspection, the state of depletion of roll 25 from time to time to determine when the controlled braking effect may be discontinued safely, view opening 58 has been provided in disc 39 of the magazine. It would be within the scope of the invention to provide for visual inspection in other ways, such as by making one or both discs of transparent material, such as one of the plastics.

Over-running of guide roller 47 should be prevented for one or more reasons. In the first place, abrasion of the emulsion side of strip 24 would be caused by the consequent slipping of roller 47 relative to said strip when motion of the latter has been stopped suddenly. In addition, over-running would be likely to produce slack in the stretch of strip 24 which underlies guide roller 46. Any slack which may occur in the vicinity of paper mask 14 is objectionable because of the possibility of distortion of the print frame 29 undergoing printing exposure at the time. Therefore, an additional over-run brake has been provided for roller 47. A convenient brake structure for this purpose is the spring tongue 60, which has its root 61 rigidly secured between plate 52 and contact shoe 55 of gravity brake 51. Tongue 60 projects reversely with respect to brake plate 52 and the free end of said tongue 60 overlies roller 47 in frictional contact with the upper surface of strip 24. The tension of brake tongue 60 would be sufficient to prevent over-running of roller 47.

In order to insure completely against distortion of the print frame 29 which is in printing station A, regardless of any strip slackness produced either behind or in advance of said station, the flat and weighty backing plate 63, which matches the upper surface of mask 14 in size and general shape, is adapted to rest upon said mask in superimposed relation to strip 24. Plate 63 preferably is faced underneath with felt or similar material, as at 64, to protect paper strip 24 and at the same time increase the braking effect exerted by the plate on said strip. This braking effect is required in addition to the plate's strip flattening function, because of the backlash produced by the feeding mechanism upon sudden deceleration thereof. In order to prevent horizontal displacement of plate 63, it is provided with a plurality of small vertical holes, preferably one in each corner, which are out of the path of strip 24 and which are adapted to be engaged with similarly located studs 66 provided on the upper face of mask 14. When plate 63 has been set down over studs 66, the weight of the plate is sufficient to hold it firmly in contact with strip 24 without the addition of any securing means, which makes the plate readily removable. Plate 63 has its rear edge cut away to provide a wide notch 67 intended to permit insertion of the operator's fingers to facilitate grasping and lifting the plate preliminary to threading a new strip of sensitized paper through the machine. Notch 67 also serves as a window, which enables the operator to determine just when each printing exposure has terminated. During exposure, the window will be illuminated by the printing light.

Strip operating or feeding section C will now be described. This section includes a frame formed by parallel front and rear plates 69 and 70, said frame being suitably carried by bracket means 71 which is supported upon stand 13. The two plates also are preferably connected together and maintained rigidly in suitably spaced relation by spacer members 72. The strip operating mechanism, which is supported and partially housed by this frame, includes feed roller 73. Roller 73 is located on the exposed front face of plate 69 so as to be aligned in path of movement of strip 24 as established by guide rollers 46 and 47, and printing station A, and is mounted on the protruding end portion of horizontal driven shaft 74 that rotates in a bearing 75 mounted in plate 69. Roller 73 is adapted to be removably secured on shaft 74 with its inner end adjacent to an annular flange 76 on said shaft by suitable means such as latch 77.

Feed roller 73 is the element of the strip propulsion mechanism which directly applies propulsive power or draft to strip 24. This action will be facilitated by the provision of one or more longitudinal rows of radially projecting pins 78 on the periphery of feed roller 73, two such rows being shown by way of example. The size of feed roller 73 and the spacing and arrangement of pins 78 should be such that the pins will coincide with perforations 28 that divide strip 24 into print frames 29. There being, as shown by way of example, two circumferentially spaced rows of pins 78 on the periphery of roller 73, one print frame 29 will be advanced one step either into or out of printing station A for each half-revolution of the feed roller. It is the usual practice, after a standard rapid printer has been converted to strip printing by the attachment thereto of the strip feeder of this invention, to devote the machine to the exclusive production of prints of one size. Therefore, after the print frame size has been determined and the appropriate mask has been applied in printing station A, it becomes necessary to adjust feed roller 73 angularly about its rotational axis to insure accurate centering of each print frame 29 on mask 14. Provision has been made for this initial frame centering adjustment in the means by which fed roller 73 is driven by shaft 74. The driving connection between shaft 74 and roller 73 includes a radially offset pin 79 which projects longitudinally from flange 76. Instead of connecting pin 79 directly to roller 73, it is adapted to be engaged in an aperture 80 provided in an angularly adjustable annular plate 81 which encircles shaft 74 and which is secured in adjusted position on the inner end of roller 73 by means such as set screws 82, which are threaded into roller 73 and project through arcuate slots 83 provided in plate 81.

Figure 7:
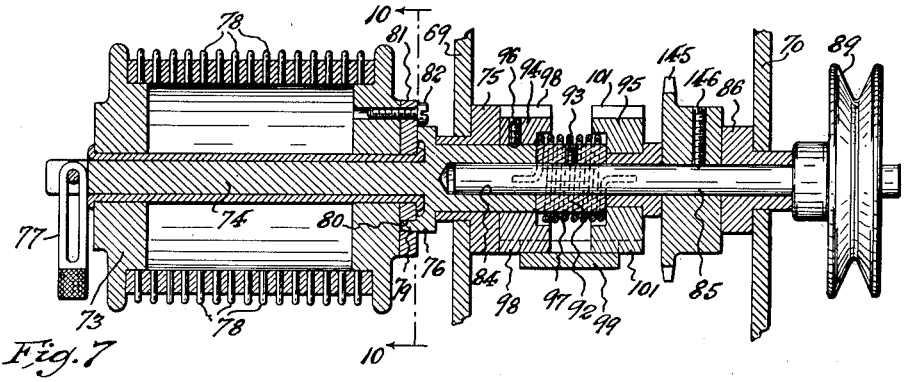
Fig. 7 is a transverse vertical section on line 7—7 in Fig. 2, drawn on an enlarged scale.
Figure 8:
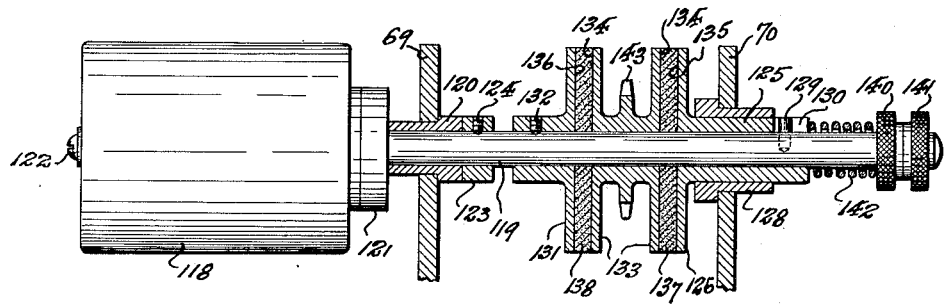
Fig. 8 is a transverse vertical section on line 8—8 in Fig. 2, also drawn on an enlarged scale.
Figure 10:
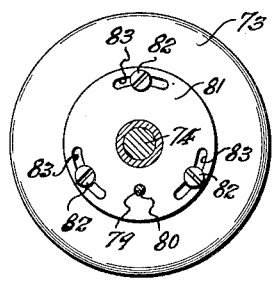
Fig. 10 is a detail sectional view on line 10—10 in Fig. 7.

Referring particularly to Fig. 7, it will be seen that the inner, rear end of driven shaft 74 is provided with cylindrical bore 84 in which the front end of a power shaft 85 is rotatably mounted. Shaft 85 is further journaled near its rear end in a bearing 86 provided in rear plate 70 of the frame. Shaft 85 is shown connected operatively to reduction-gear motor 87 by belt 88, which runs on pulleys 89 and 90 fixedly mounted on shaft 85 and motor shaft 91 respectively. Motor 87 is connected to a source of electric power (not shown) and is controlled by switching means (also not shown). It is to be understood that some other type of prime mover, or different power transmission means, may be employed without departing from the scope of the invention. The essential requirement is that driving shaft 85 shall be rotated at constant speed when the strip feeder is in operation.

Figure 9:
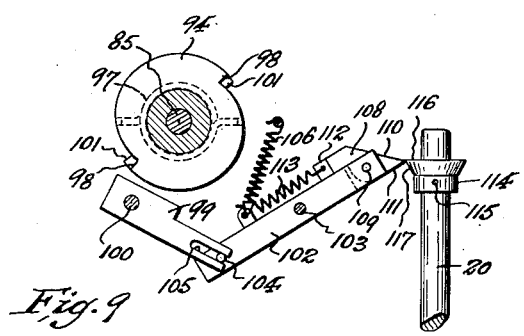
Fig. 9 is a fragmentary sectional view similar to Fig. 6, but showing a controlling detent in tripped position to permit clutch operation.

In order to cause feed roller 73 to advance precisely 180 degrees following each printing exposure and thereby move a new print frame 29 of strip 24 into printing station A, a controllable half-revolution clutch has been provided for connecting power shaft 85 with driven shaft 74. Although some equivalent type of clutch may be employed it is preferred to use the coiled-spring type disclosed in Figs. 2, 6, 7 and 9. This clutch includes a clutch barrel 92, which is fixed on power shaft 85 by suitable means, such as set screw 93. Two clutch spring anchoring collars 94 and 95 are respectively associated with opposite ends of clutch barrel 92. Anchoring collar 94 is fixedly secured on the inner end of driven shaft 74 by means such as set screw 96, whereas anchoring collar 95 is loosely mounted on power shaft 85. Clutch barrel 92 is interposed between anchoring collars 94 and 95. A coiled clutch spring 97 surrounds the periphery of clutch barrel 92 and has one end connected to anchoring collar 94 and the opposite end connected to anchoring collar 95. The size of spring 97 is such that it will strongly and frictionally grip the periphery of clutch barrel 92 tightly when said spring is in its normally contracted condition. However, when expanded slightly by torsional twisting, such as would be exerted by turning anchoring collar 94 in clockwise direction and anchoring collar 95 in counter-clockwise direction (Figs. 6 and 9), clutch spring 97 relaxes its grip on clutch barrel 92. The same action will result if anchoring collar 94 be held stationary and anchoring collar 95 be turned counter-clockwise. It is precisely the last-mentioned manner of expanding spring 97 that is practiced in the clutch as shown. For this purpose, anchoring collar 94 is provided with two diametrically opposite radial stops 98 on its periphery, and a detent 99 is pivoted, as at 100, in connection with frame 69—70, for engagement, when in the holding position shown in Fig. 6, with one of stops 98 to hold anchoring collar 94 against rotary movement in clockwise direction. The end of clutch spring 97 which is connected to anchoring collar 94 will therefore likewise be held against movement in said direction. Each stop 98 cooperates with detent 99 in the performance of two functions, namely: (1) to check the motion of feed roller 73 at the instant when a print frame 29 of strip 24 has arrived at printing station A and to hold roller 73 in this position; and (2) to immobilize the end of clutch spring 97 which is attached to anchor collar 94. Setscrew 96 permits adjustment of anchoring collar 94 angularly on driven shaft 74 in order to coordinate the detent-engaging position of each step 98 with the printing station registration of one of print frames 29. Anchoring collar 95 also has two diametrically opposite stops 101 for engagement by detent 99 when in holding position. When clutch spring 97 is in normally contracted condition, stop 101 on anchoring collar 95 will be offset angularly with respect to stop 98 on anchoring collar 94 in clockwise direction, as shown in Fig. 9. In the offset relation of corresponding stops just mentioned, clutch spring 97 is contracted and in gripping engagement with clutch barrel 92. Therefore, the clutch as a whole is in engaged condition and shaft 74 will be driven positively by power shaft 85. When detent 99 is in the holding position shown in Fig. 6, it will be in the path of stops 98 and 101. Therefore, when stop 101 strikes detent 99, the end of clutch spring 97 attached to anchoring collar 95 will be checked in motion and thus will subject said spring to torsional expanding action throughout the time required for stop 98 to move into contact with detent 99. Thereupon, both anchoring collars will be held stationary with clutch spring expanded and free from gripping engagement with clutch barrel 92 so that power transmission to feed roller 73 is interrupted. The immediate result of subsequent tripping of detent 99 will be release of the tension of clutch spring 97 and consequent contraction thereof into gripping engagement with clutch barrel 92 so that power transmission to feed roller 73 is resumed.

The actuating means for detent 99 preferably is in the structural form shown in Figs. 2, 6 and 9, wherein a rocker arm 102 is pivoted medially on a horizontal axis, as at 103, in connection with frame 69—70. Rocker arm 102 is mounted contiguous to detent 99 and in substantial prolongation thereof when in the relative positions shown in Fig. 6. Roughly speaking, detent 99 and rocker arm 102 oscillate in the same plane. Contiguous ends of detent 99 and rocker arm 102 are connected to each other with allowance for slight play preferably by means of pin 104 and slot 105. Spring means 106 exerts upward pull on the end of rocker arm 102 which is connected to detent 99 and thereby tends normally to maintain said detent in holding position, as shown in Fig. 6. The free end of rocker arm 102 is located laterally adjacent to the upper end portion of operating rod 20, which has already been described. It is now appropriate to mention the fact that the upper end portion of rod 20 is slidable in a bearing 107 provided in connection with frame 69—70. A trigger 108 is pivoted as at 109 on the free end of rocker arm 102 on a horizontal axis so as to project therefrom, and has an outer end provided with an upper chamfered face 110 and a straight inner or impact face 111. Trigger 108 has a stop 112 overlying the upper surface of rocker arm 102 for contact therewith when impact face 111 is flush with the lower surface of said rocker arm as shown in Figs. 6 and 9. Spring means 113 tends to maintain stop 112 in the position shown. A tripping member 114 is fixedly mounted on control rod 20 in such a location that said member will move up and down past trigger 108 during reciprocation of rod 20. Tripping member 114 is capable of vertical adjustment on rod 20 and is secured in adjusted position preferably by means of setscrew 115. The shape of tripping member 114 is preferably such that it is provided with a substantially horizontal upper impact face 116 and an undercut or lower cam face 177. Trigger 108 is located in the path of vertical movement of faces 116 and 117 of tripping member 114. Downward movement of rod 20 will cause cam face 117 of tripping member 114 to contact chamfered upper face 110 of trigger 108. When this happens, no disturbance of detent 99 will result, because trigger 108 will yield and move out of the path of tripping member 114 against the resistance of spring means 113, which latter means automatically restores the trigger to set position after the tripping member has been cleared. Upon upward motion of rod 20, impact face 116 of tripping member 114 will strike against the under or impact face 111 of trigger 108 and will cause rocker arm 102 to oscillate counter-clockwise and thereby move detent 99 into the tripped position shown in Fig. 9.

Wind-up means for paper strip 24 includes a spool 118 which is adapted to be removably mounted on the outer end of shaft 119 that is journaled in bearing 120 provided in front frame plate 69. When applied to shaft 119, the inner end of spool 118 abuts flange 121 provided on said shaft and may be clamped tightly against said flange by screw 122, which is threaded into the front end of shaft 119 and bears against the outer end of spool 118. A collar 123 is fitted on shaft 119 inside frame plate 69 so as to abut the inner end face of bearing 120. Suitable means, such as setscrew 124, secures collar 123 fixedly to shaft 119. Collar 123 cooperates with flange 121 to prevent endwise play of shaft 119. The rear end portion of shaft 119 extends through the hub 125 of one element 126 of a slip clutch means located in frame 69—70. Clutch element 126 is mounted by its hub 125 for rotation and longitudinal sliding movement in bearing 128 provided in rear frame plate 70. Clutch element 126 is secured against rotation relative to shaft 119 by the engagement of radial pin 129 carried by said shaft with longitudinal slot 130 provided in the rear end of hub 125 of said clutch element 126. A second clutch element 131, which is complementary to element 126, is secured fixedly on shaft 119 between frame plates 69 and 70 by means such as set screw 132. Complementary clutch elements 126 and 131 therefore turn with shaft 119 whenever it is rotating. A third clutch element 133, which coacts with complementary clutch elements 126 and 131, is fitted on shaft 119 in interposed relation to said complementary clutch elements and is free for relative rotation with respect to shaft 119 under conditions of clutch slippage. All three elements of the clutch means are of the annular plate type, but element 133 differs from the other in that it presents two oppositely facing frictional surfaces 134 respectively in opposed relation to the inwardly facing frictional surfaces 135 and 136 of elements 126 and 131. The frictional surfaces of element 133 are spaced from the opposed surfaces of elements 126 and 131 to accommodate friction rings 137 and 138 of suitable material which are adapted to be inserted therebetween. In order to provide easily regulatable means for applying the required pressure to the coacting clutch elements, the rear end of shaft 119 has been extended beyond hub 125 of clutch element 126 and has been threaded to receive an adjustable stop nut 140 and cooperating locknut 141. A compression spring 142 has been applied around the projecting end of shaft 119 between stop nut 140 and hub 125. By adjusting nut 140 the degree of clutch friction may be determined with precision to meet operational conditions.

Clutch element 133 has been provided with peripheral sprocket teeth 143 and is in effect a sprocket wheel adapted to be connected by sprocket chain 144 to a driving sprocket wheel 145 which is mounted on power shaft 85 of the strip feeding mechanism. Suitable means, such as setscrew 146, secures sprocket wheel 145 fixedly on power shaft 85. The friction set up in the slip clutch means should be such that wind-up spool 118 will be driven whenever feed roller 73 is caused to advance through one of its half-revolution step movements, but should permit slipping of clutch element 133 with respect to elements 126 and 131 when feed motion ceases and strip 24 imposes positive drag on spool 118.

The mechanism of section C is completed by idler rollers 147 and 148, which are rotatably mounted at the front of frame plate 69 in the path of movement of strip 24 to feed roller 73 and windup spool 118 by means of shafts 149 and 150 respectively. Idler roller 147 is located between feed roller 73 and printing station A at such a level that the plane of the upper surface of paper mask 14 will be tangential to the under side of the periphery of said idler roller. Idler roller 147 thus serves to aid guide roller 46 of magazine section B in guiding paper strip 24 properly in its passage through the printing station, and then guides the strip for movement over the top of feed roller 73. Idler roller 148, on the other hand, has been introduced into the path of strip 24 between feed roller 73 and wind-up spool 118 to create a loop in the strip which will embrace as great an area of the peripheral surface of roller 73 as practicable. This has been done to afford maximum surface traction between roller 73 and strip 24 in addition to the positive traction created by engagement of roller pins 78 with strip perforations 28. If strip 24 were led direct from the top of feed roller 73 to the top of wind-up spool 118, the sudden acceleration of starting would be likely to cause the uppermost row of pins 78 to rip the paper and lose traction. Such action also would mutilate the strip and render the printed frames valueless. The provision of a loop in strip 24 which embraces a large part of the periphery of feed roller 73 has an added advantage. Sometimes perforated rolls of sensitized paper are not desired to be used. In such event, a pinless feed roller must be substituted for the preferred form of feed roller which has been above described. With no pins to engage perforations in the strip, there would not be sufficient traction between the feed roller and strip if the strip passed directly from the top of the feed roller to wind-up spool 118. However, the embracing loop will provide necessary strip feeding traction by a pinless feed roller.

The operation of a printer having the novel strip feeder means is as follows: The first thing to be done is to apply an empty wind-up spool 118 to shaft 119 in the obvious manner. Then backing plate 63 is lifted from its seat on mask 14, and a new roll 25 of sensitized paper is loaded into the magazine. This is accomplished by lifting the magazine until squared hubs 36 and 37 have become disengaged from slots 34 and 35. Shaft 41 must then be removed from under gravity brake 51 and brake 60 which is supported by the latter. This is done by moving the magazine to the left (Fig. 1) before too much tension has been placed on brake tongue 60. These two brakes will now be free to swing downwardly into depending position, in which they may be left until the loaded magazine has been replaced in frame 31—32. Now, disc 39 is removed endwise from shaft 41 and the core 26 of a new roll 25 is slipped onto said shaft, care being taken to arrange the roll so that the free end of the strip will come off the top of the roll with the emulsion side underneath. Disc 39 is replaced on shaft 41. Brakes 51 and 60 are then lifted and held out of the way of roll 25 while the magazine is being replaced in the frame. Following installation of the magazine, the free end of strip 24 is threaded over guide roller 47, under guide roller 46, across mask 14, under idler roller 147, and onto the top of feed roller 73. At this point, care must be taken to bring the leading row of perforations 28 into engagement with pins 78. The threading process is continued by passing the end of strip 24 under idler 148 and finally taping or otherwise securing said strip end to the uppermost part of the periphery of the new wind-up spool 118. Backing plate 63 is now replaced above strip 24 and mask 14. Draw rod is manipulated to force plates 31 and 32 toward each other and thereby press discs 39 and 40 of magazine into contact with the side faces of roll 25 so as to apply the required braking action supplemental to that afforded by gravity brake 51 while the roll is of large radius. Next, the electric current is turned on to start the motor 87. Power shaft 85 of the feed roller operating mechanism will thus be set in motion, but feed roller 73 will remain idle by engagement of detent 99 with one of the stops 98 on anchoring collar 94 of the spring clutch, which is then in disengaged condition, so strip 24 will be motionless with an unprinted print frame 29 exposed in printing station A.

When the operator is ready to commence printing, he depresses treadle 17 and holds it down throughout the duration of the printing cycle. Depression of the treadle causes finger 22 on control rod 20 to close control switch 16, and thus to start a printing cycle. As the printing cycle commences, the printing light will become visible through the window in backing plate 63. Upon termination of the printing cycle, the printing lamp will be turned off automatically and a pilot lamp (not shown) will be relighted. This visible blinking of light in the window will be a signal to the operator that the printing exposure has been completed. He, thereupon, releases pressure on treadle 17, which will be re-set by spring 19, thereby pushing rod 20 upward and permitting control switch 16 to open. At the same time, tripping member 114 will strike trigger 108 and thereby trip detent 99 into the position shown in Fig. 9. The tripping of detent 99 and its restoration to holding position (Fig. 6) occur substantially instantaneously, as tripping member 114 rides over trigger 108 and before a half-revolution of feed roller 73 has been completed. During the half-revolution of feed roller 73, strip 24 will be advanced one step to clear one print frame 29 from printing station A and feed the succeeding frame into said station, ready for repetition of the printing cycle.

As printing progresses, the operator should occasionally inspect the state of the printing paper supply depletion of roll 25, which is visible through view opening 58 in the magazine. When it has been determined that the roll radius has been reduced sufficiently to make continuation of side brake action dangerous to the strip, he should relax draw rod 57 to relieve the side pressure on said roll 25. From this stage on, gravity brake 51 will be capable of preventing overrunning of the roll.

When the trailing end of strip 24 parts from core 26, it will not suffer objectionable loss of tension. Brake 60 will take over from brake 51 at first. Then, when roller 47 has been cleared, guide plate 50 and backing plate 63 will take care of the last print frame as it enters printing station A.

If the operator be sufficiently alert and quick, the total printing time for a strip will be consumed almost entirely by the repeated printing cycles of the printer, because the feeder operates at such high speed. In any case, a strip of a given number of print frames can be run off in a fraction of the time required to print the same number of pictures on cut paper in the old way. In addition to the saving in time, the printed strip is adapted to modern machine development processing.

It will be understood that various changes can be made in the above described strip feeder mechanism for photographic printing apparatus without departing from the scope of the invention as defined in the following claim. It is therefore intended that all matter described in the foregoing specification and shown in the accompanying drawings shall be interpreted as illustrative and not in a limiting sense.

We claim:

Transmission mechanism for intermittently driving a strip feed roll, comprising a constantly rotating power shaft, a driven shaft for operating the feed roll, a clutch including a clutch barrel fixed on the power shaft, a helical clutch spring arranged to embrace and normally grip the periphery of said clutch barrel, a clutch driven collar secured to the driven shaft and having one end of the clutch spring affixed thereto, a clutch release collar freely rotatable on the power shaft and having the opposite end of the clutch spring affixed thereto, each of said collars having a radially projecting stop, the stop of the clutch release collar being normally disposed in advance relation to the stop of the clutch driven collar when the clutch spring is in gripping relation to the clutch barrel for transmission of power by the latter from the power shaft to the driven shaft, a detent member movable between normal holding position in the paths of the stops of the clutch driven and clutch release collars and tripped position outside said paths, the arrangement of the detent member being such that when in holding position it will first engage the stop of the clutch release collar to arrest movement of said collar while the clutch driven collar advances to engage its stop with the detent member and in so doing to expand the clutch spring so as to relax its grip on the clutch barrel and thereby interrupt transmission of power from the power shaft to the driven shaft, and operator-controlled tripping means by which the detent member may be temporarily moved into tripped position, comprising a pivoted rocker arm having one end thereof pivotally connected to the detent member in such manner that movement of said rocker arm will move said detent member between holding and tripped positions, an operator-controlled reciprocable trip rod, a tripping member on said rod, a trigger carried by the free end of the rocker arm and disposed in the path of said tripping member, said trigger being adapted to move the rocker arm into detent tripping position upon movement of the trip rod in one direction and being yieldable from the path of the tripping member upon retracted movement of said trip rod, and yieldable means tending to urge the detent member into holding position.

HENRY G. GOETZ.
HENRY F. RUSCHMANN.

REFERENCES CITED

The following references are of record in the file of this patent:

UNITED STATES PATENTS

| Number | Name | Date |
|---|---|---|
| 1,166,379 | Ludlam | Dec. 28, 1915 |
| 1,363,518 | Kulus | Dec. 28, 1920 |
| 1,402,167 | Kingsbury | Jan. 3, 1922 |
| 1,584,185 | Mitchell | May 11, 1926 |
| 1,598,956 | Capstaff | Sept. 7, 1926 |
| 1,704,794 | Fritts | Mar. 12, 1929 |
| 1,900,878 | Hopkins | Mar. 7, 1933 |
| 1,990,915 | Mortimer | Feb. 12, 1935 |
| 1,993,178 | Mitchell | Mar. 5, 1935 |
| 2,031,071 | Roehrl | Feb. 18, 1936 |
| 2,125,388 | Monroe | Aug. 2, 1938 |
| 2,140,445 | Mihalyi | Dec. 13, 1938 |
| 2,161,941 | Zapp | June 13, 1939 |
| 2,207,211 | Worlatschek | July 9, 1940 |
| 2,253,090 | Peterson | Aug. 19, 1941 |
| 2,260,672 | Johanson | Oct. 28, 1941 |
| 2,298,970 | Russell et al. | Oct. 13, 1942 |
| 2,313,662 | Morgan et al. | Mar. 9, 1943 |
| 2,324,086 | Hutchison | July 13, 1943 |
| 2,394,817 | Sonne | Feb. 12, 1946 |
| 2,403,587 | Doyle | July 9, 1946 |
| 2,419,836 | Holbrook | Apr. 29, 1947 |
| 2,439,055 | Pratt | Apr. 6, 1948 |
| 2,475,432 | Marihart | July 5, 1949 |